United States Patent
Swanson et al.

[11] 3,943,233
[45] Mar. 9, 1976

[54] PROCESSING FINELY DIVIDED SOLIDS ON A CONTINUOUS VACUUM BELT FILTER

[75] Inventors: David B. Swanson, Cranford; Walter L. Haden, Jr., Westfield, both of N.J.

[73] Assignee: Engelhard Minerals & Chemicals Corporation, Menlo Park, Edison, N.J.

[22] Filed: Feb. 20, 1974

[21] Appl. No.: 444,173

[52] U.S. Cl. .............. 423/332; 75/1 R; 210/401
[51] Int. Cl.² ............. C01B 33/32; B01D 33/04
[58] Field of Search ......... 423/332; 210/401; 75/1, 75/3–5

[56] References Cited
UNITED STATES PATENTS

| | | | |
|---|---|---|---|
| 2,880,875 | 4/1959 | Alston | 210/401 |
| 3,087,620 | 4/1963 | Hirs | 210/401 |
| 3,495,971 | 2/1970 | Ban | 75/3 |
| 3,687,640 | 8/1972 | Sams | 423/332 |
| 3,796,317 | 3/1974 | Lippert | 210/401 |

Primary Examiner—Peter D. Rosenberg
Attorney, Agent, or Firm—Melvin C. Flint; Inez L. Moselle

[57] ABSTRACT

Disclosed is a method for subjecting a finely divided solid to a series of processing steps on a single horizontal vacuum belt filter wherein the processing includes a liquid-solid mass transfer function, such as ion-exchange, carried out by percolation, and this step is followed by at least one step, such as washing, in which rapid passage of a large volume of liquid through the solid takes place. The method is used to ion-exchange zeolitic microspheres in the production of a fluid cracking catalyst.

10 Claims, 1 Drawing Figure

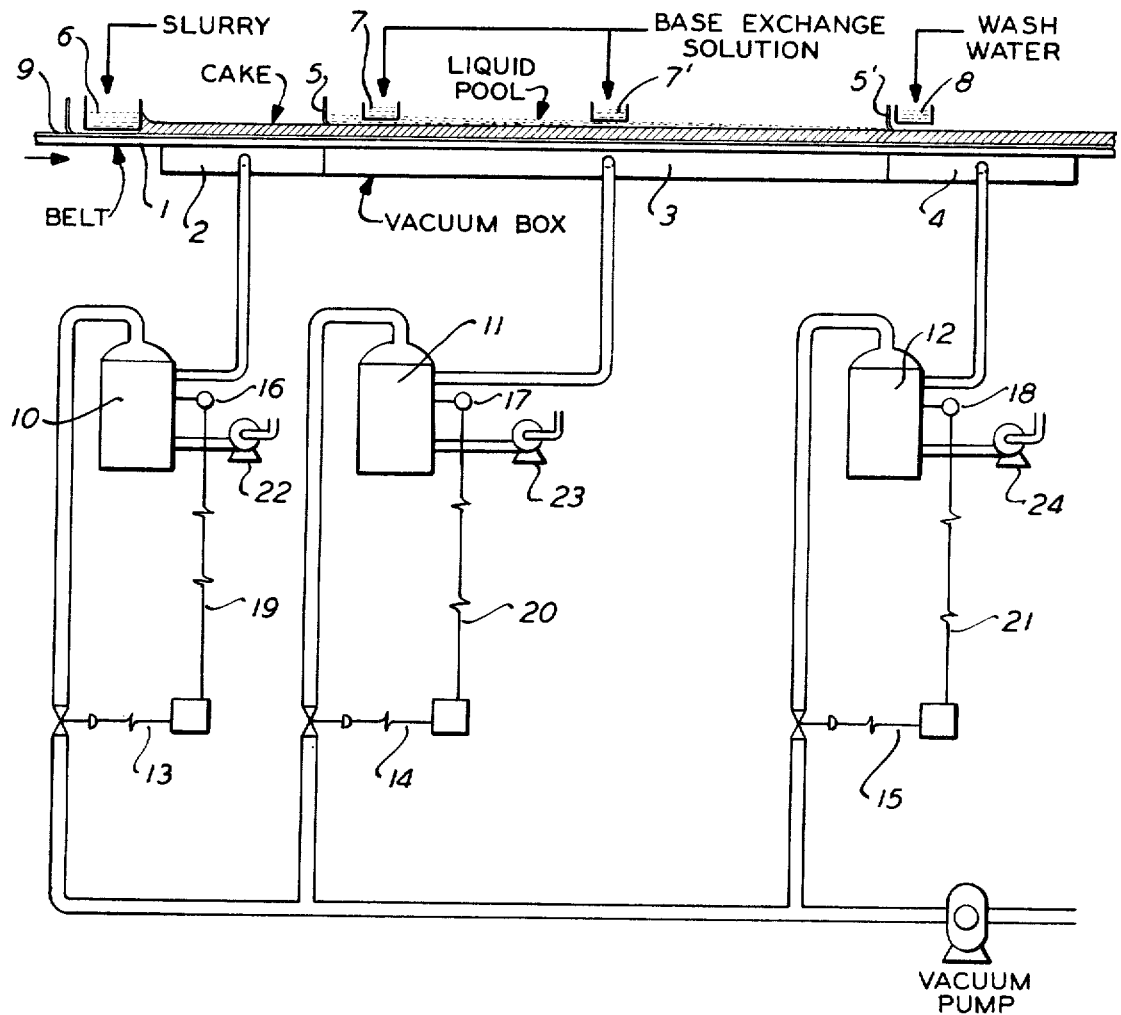

PROCESSING FINELY DIVIDED SOLIDS ON A CONTINUOUS VACUUM BELT FILTER

BACKGROUND OF THE INVENTION

1. Field of the Invention

This invention relates to a method for carrying out a plurality of liquid-solid contact steps on a single vacuum belt filter. The invention is particularly directed to the processing of a finely divided solid material wherein the processing includes at least one step such as ion-exchange, extraction, leaching, adsorption or the like, in which the rate constant is an important factor and the desired mode of carrying out the reaction is by percolation and the processing also includes at least one other step, such as washing, in which liquid-solid contact time is less than that in the percolation operation.

The invention is especially concerned with the production of fluid zeolitic cracking catalysts by a series of steps including ion-exchange of zeolitic microspheres under percolation conditions allowing for relatively long liquid-solid retention times to satisfy the mass transfer rate content and subsequent rapid washing of the ion-exchanged microspheres with relatively large volumes of another liquid.

Horizontal vacuum belt filters are widely used in the chemical and mineral processing industries. The belt filters comprise an endless permeable belt, usually perforated rubber, supporting a filter cloth and traveling horizontally across a vacuum box. Several models of continuous horizontal vacuum filters are sectionalized to provide separated compartments above the belt. In some units the vacuum box under the belt is subdivided so that the vacuum in the sections above the belt can be individually controlled or the filtrates from the sections can be separately collected. The sectionalized belt filters are unique in that they permit several processing functions to be carried out on a continuous basis on the same piece of equipment. For example, a finely divided slurry can be dewatered, washed and then rewashed on the same filter. The opportunity for conducting a multiplicity of processing steps on a continuous basis on the same unit represents an improvement over processing on a rotary vacuum filter in which the geometry of the unit precludes such processing. However, the sectionalized horizontal vacuum belt filters as heretofore operated are strictly limited in the variety of function which can be conducted with efficiency on the same belt. Thus, the functions that can be carried out serially on the same belt have been limited by the fact that the rate of carrying out any one function was inter-related to the rates of carrying out the other functions. Such rate was dependent upon factors such as belt speed, cake and filter medium resistance and depth of vacuum. In prior methods for processing on a vacuum belt filter, these were constant for all functions.

2. Prior Art

Continuous horizontal belt filters are known in the art. U.S. Pat. No. 2,880,875 to P. W. Alston, "Filtration Apparatus and Method," is directed to such apparatus and its use in filtration. Continuous sectionalized horizontal belt vacuum filters provided with subdivided vacuum boxes are also known in the art. See Perry's "CHEMICAL ENGINEERS' HANDBOOK," at 19–81 (1963). Commercially available horizontal belt filters include the "Eimcobelt" filter and the Straight Line Filter. The latter is described and illustrated in *CHEMICAL ENGINEERING CATALOG*, CEC, 55th Edition, page 4260, published by Rheinhold Publishing Corporation (1971). The filter illustrated in this catalog includes a sectionalized drainage belt with a vacuum box running the entire effective length of the unit. The vacuum box is divided into three components, all of the same length, and associated with individual outlets, all leading to a single receiver. Illustrated diagrammatically in CEC is a scheme for operating a horizontal belt filter containing three compartments wherein the first provides a cake-forming zone operated under flooded conditions, the second is a washing zone, also operated under flooded conditions, and the third section is a drying zone, operated without flooding. Such processing could obviously not be used in carrying out serially a rate-limited mass transfer function followed by a step such as rapid washing. A flooded feed to a percolation zone would minimize the effectiveness of the percolation step, as would the passage of flooded feed into a washing zone.

THE INVENTION

We have invented a novel method and system for utilizing a single vacuum belt filter with a subdivided vacuum box to accomplish a multiplicity of processing functions or steps, at least one of which is a mass transfer operation involving contacting a liquid with a finely divided solid under percolation conditions and a more rapid liquid-solid contact step applied to the solid product from the percolation treatment. Our invention also includes provision of a technique for controlling the state or condition of the finely divided solid so that the solid is in essentially optimum condition before and during percolation for optimum percolation efficiency and the solid is also in optimum condition for auxiliary processing.

In carrying out the invention the desired vacuum depths in the separate sections of the unit are achieved by providing separate liquid receivers for each vacuum box division and regulating the vacuum level, by means of pressure control valves, in each receiver vessel corresponding to a different function.

More particularly, our invention comprises the steps of slurrying finely divided solid particles of the material to be processed in a first liquid, feeding the slurry to the feed end of a continuously traveling horizontal vacuum belt filter, adjusting the vacuum under the feed end of the filter to a moderate value, sufficient to drain liquid from the finely divided solid and form a cake having a smooth, substantially dry surface but carefully limited to minimize removal of water from voids between particles and thereby introduce air into the cake, continuously adding a second liquid containing material capable of undergoing a mass transfer reaction with the finely divided particles of solid into the resulting superficially dried cake on the moving filter belt from at least one location above the belt, and adjusting the vacuum under the section of the belt in which the second liquid is added to a low level, controlled to maintain a quiescent pool of liquid over the cake over a substantial length of the belt, and sufficient to cause the pool to percolate through the cake as it moves on the belt, the vacuum applied to the cake after it passes under the pool being sufficient to drain sufficient liquid from the cake to provide a smooth, substantially dry surface but insufficient to remove substantial liquid from the body of the cake, whereby liquid is present between particles of solid in the cake, continuously adding a third liquid to the resulting superficially dried cake from at least one location above the cake while applying sufficient vacuum to the cake to cause rapid drainage of the liquid through the cake, and discharging the cake from the moving filter belt.

In an embodiment of the invention, a single sectionalized vacuum belt filter with a subdivided vacuum box is used to subject a finely divided solid serially to the combination of ion-exchange as the mass transfer function and washing. In an especially preferred embodiment of the invention the solid which undergoes the processing is a zeolitic fluid catalyst precursor in the form of microspheres and the ion-exchange reaction is intended to replace ion-exchangeable alkali metal in the zeolite with other cations. One aspect of the especially preferred embodiment of the invention involves utilizing spent ion-exchange liquid as the liquid used to slurry the zeolitic microspheres, whereby preliminary ion-exchange takes place when the microspheres are formed into a cake suitable for percolation contact with exchange liquid on the same filter belt.

A particular advantage of the present invention is that it permits complete independence of function rate for each function, simultaneously while establishing conditions optimum for each function. Thus, the cake undergoing the liquid-solid mass transfer has a smooth surface and the body contains minimal air or cracks. Air in the body of the cake or superficial cracks would be detrimental to efficient percolation which requires intimate contact between liquid and individual fine particles. The cake is restored to a condition in which the surface only is dry after the mass transfer reaction is completed by controlling the vacuum depth in the receiver for the percolated liquid. Consequently, auxiliary processing is also carried out under conditions optimum for liquid-solid contact.

The invention provides a sufficient time for carrying out the mass transfer reaction without necessitating a correspondingly prolonged time for auxiliary processing.

Reference is made to the accompanying drawing and the following description thereof which will serve to set forth more clearly an embodiment of the invention, as well as to point out additional features and advantages in connection therewith.

Referring now to the drawing, there is indicated diagrammatically a side view in section of the portion of a continuous horizontal belt-vacuum filter as it is used in practicing our invention to conduct an ion-exchange reaction. The drawing includes a sketch of the profile of the liquid and solid phases present when the system is in use.

The filter illustrated in the drawing includes an endless permeable flat belt 1, suitably perforated rubber, which carries on its upper surface a filter medium 9, suitably cloth having openings smaller than the finest solid particles in the slurry. The belt with filter medium is continuously moved horizontally in the direction indicated over a stationary vacuum box which is subdivided into three divisions, 2, 3 and 4. Means (not shown) are provided to establish a vacuum seal between the vacuum box and the belt. Piping in the bottom of divisions 2, 3 and 4 of the vacuum box communicates through separate liquid receivers, 10, 11 and 12, to filtrate pumps 22, 23 and 24 and a vacuum pump adapted to apply controlled vacuum to these receivers. Each receiver is equipped with its own pressure control valve, 13, 14 and 15, to regulate separately the depth of vacuum in the receivers. Each control valve 13, 14 and 15 is associated with a pressure indicator control, 16, 17 and 18, respectively, and a pneumatic signal transmission system, 19, 20 and 21. Vertical rubber dams 5 and 5' are located above the belt between vacuum boxes 2 and 3 and 3 and 4, respectively. These dams may be mounted for upward and downward adjustment and they can be removed as required.

Within the compartments defined by the dam walls are weir boxes 6, 7, 7' and 8. These boxes may be associated with sensing devices to control feed rate. It will be noted that the weir boxes 6 and 8 in the cake-forming and washing sections, respectively, are located to feed liquid at the beginning of each of the zones. In the mass transfer, elongated section, feed from a divided feed supply means is split into two portions, one of which is fed through box 7 near the beginning of the section at 7 and the other near the center of the section at 7'.

Means for housing the unit, driving the belt, washing one or both sides of the filter cloth on the return trip under the belt, guiding the belt and other details are well known in the art. Reference is made to illustrations appearing in *CHEMICAL ENGINEERING CATALOG* (CEC) 55th Edition, page 4260, published in 1971 by Rheinhold Publishing Corporation, Inc. for details of the construction of a horizontal sectionalized belt filter with a subdivided vacuum box and dams between sections. It is noted that the filter unit diagrammatically presented in the accompanying drawing herein differs from the unit shown in CEC in that the middle section of our unit is about twice as long as that of the middle section shown in CEC. Further, our unit includes vacuum controls associated with separate receivers (all shown in our drawing) which do not appear in the unit shown in the CEC publication.

Still referring to the drawing, the solid to be processed is formed into a fluid slurry in a suitable liquid and this slurry is continuously charged through weir box 6 to the forward end of the filter 1 on the endless belt which is continuously moving from left to right. Control valve 13 associated with liquid receiver 10 is set at a moderate level to provide a thin cake which, when it leaves the cake-forming section and passes under the dam wall between these sections, is superficially dried. The cake, typically ½ inch to 1 inch thick, should have a smooth-crack-free surface but must contain liquid in the voids between substantially all of the solid particles. The use of excessive vacuum in this cake-forming zone is carefully avoided since the air would reduce the efficiency of the subsequent percolation treatment. Slurry liquid passing through the cake passes into receiver 10 from which it is continuously discharged into a tank or other suitable holding system by pump 22.

As the superficially dried cake passes under dam 5 between the first two sections, it is contacted with a second liquid fed through weir boxes 7 and 7' onto the cake. The weir boxes are preferably provided with means such as rubber guiding lips, not shown, to assure gentle flow of the contacting liquid with the thin cake. This is done to avoid breaking up or forming crevices on the surface or the body of the cake. The vacuum in receiver 11 is carefully controlled through pressure controls 14 to maintain a relatively quiescent pool of ion-exchange liquid over the thin cake for a substantial length of the cake, at least between 7 and 7', as the cake travels through the mass transfer section. In some cases, the liquid can be charged to the mass transfer section or zone from a single point. An example would be when the mass transfer rate is moderately high. In other cases, for example, when very long contacting times are required, the liquid may be added at three or more locations. In this case, mass transfer section may be increased in length. Liquid percolated through the cake drains through the filter medium 9 into receiver 11 and is removed by pump 23. The vacuum level in receiver 11 is set to dry superficially the ion-exchanged cake so that the cake surface is substantially dry, smooth and free from cracks and the body of the cake contains liquid between voids in the particles when the thin cake passes under the dam 5' and enters the section of the belt over vacuum box division 4 for washing.

As soon as the cake enters the section of the belt above the vacuum box division 4, it is contacted with wash liquid fed from weir box 8 at a suitable rate. In this section the solids are contacted with large volumes of liquid passing rapidly through the cake. To accomplish this a high vacuum depth is set in receiver 12 by control valve 15. In this section it is not necessary, as it was in the other sections, to exclude air from the body of the cake. Thus, the vacuum applied to receiver 12 is correlated with the rate of feed of wash water to provide essentially instant drainage of liquid through the cake into receiver 12 from which it is removed by pump 24. The cake is discharged by gravity from the end of the belt as it passes over a pulley system (not shown). The filter may be washed on one or both sides, as required, on its return trip under the unit. This may be accomplished by means shown at CEC, page 4260.

Our invention has been successfully used on a commercial-scale in the production of a fluid zeolitic cracking catalyst.

The processing, prior to practice of the instant invention, involved reacting spray dried calcined microspheres of kaolin clay in aqueous sodium hydroxide solution to form a suspension in a sodium silicate mother liquor of microspheres composed of synthetic crystalline faujasite in sodium exchanged form and a silica-alumina residue of calcined clay. The procedure is described in U.S. Pat. No. 3,647,718 to W. L. Haden, Jr. et al.

Utilizing a vacuum belt filter in conventional manner, the zeolitic microspheres were deliquored and then washed, discharging a cake of zeolitic microspheres for subsequent ion-exchange treatment and washing. The washed microspheres were essentially all in the particle size range of 20 to 150 microns.

The objective of the subsequent treatments, all carried out in accordance with our invention on a single belt filter, substantially as illustrated in the accompanying drawing, was to form a cake suitable for ion-exchange by percolation, ion-exchange the microspheres, wash the ion-exchanged microspheres and discharge the washed microspheres as a solid cake. In carrying out the exchange treatment, it was desired to ion-exchange the sodium in the microspheres with sufficient ammonium ions to reduce the sodium from an initial level of about 10% by weight to about 1% by weight and to remove residual ion-exchange liquor from the exchanged microspheres on a continuous basis with simple equipment that occupied minimal space. It was desired to utilize three equivalents ammonia or less per equivalent sodium while minimizing the volume of ion-exchange solution in order to avoid either excessive consumption of exchange solution or the creation of large quantities of spent solution which would require a costly drying operation to recover the salts contained in the solution. Past experience in base-exchanging the microspheres with ammonium nitrate by means of a staged countercurrent contact system utilizing a series of thickeners, in conventional manner, indicated that the desired sodium level could be achieved while using a total of three equivalents or less of ammonia per equivalent of sodium provided very dilute exchange solutions were employed. This would create large volumes of spent nitrate solution in commercial practice. Further, adaptation of the countercurrent procedure to commercial operation would have necessitated an unduly large investment in equipment and also plant site because of the large size of the equipment needed.

The vacuum belt filter used in the catalyst plant had an effective belt length (length of belt over the suction box) of 12 feet and was 4 feet wide. The filter was divided into three sections defined by rubber dams. The first section (feed end) was about 3 feet long, the central elongated percolation section about 6 feet long and the third (washing) section was 3 feet long. The dam walls were about 4 inches high and were adjusted to a height of about 1 inch above the cloth. The vacuum box under the belt was divided into three sections, approximately 3 feet, 6 feet and 3 feet, and were coextensive with the sections established by the dams above the belt. The unit was equipped with a polypropylene filter cloth having openings smaller than the finest particles in the feed.

The unit was operated with a belt speed of about 4 ft./min. in order to establish a 90 second contact period in the percolation zone established in the middle 6 foot section. This contact period would satisfy the mass transfer rate constant for the particular reaction involved.

The microspheres containing zeolite in sodium form were slurried at about 40% solids in spent ion-exchange liquor from a previous ion-exchange treatment. This liquor was composed of a mixture of sodium nitrate and ammonium nitrate. The slurry was continuously charged through a weir box to the feed end of the moving filter cloth at a rate automatically controlled to provide a cake of about ¾ to 1 inch thickness. The vacuum in the receiver associated with the division of the suction box under the cake-forming zone at the feed end of the belt was set to a moderate level of about 10 inches Hg to provide the desired superficially dried cake of microspheres at the end of the cake-forming zone. Slurry liquid was continuously drained into the receiver leading to the vacuum box in this section.

As the cake entered the ion-exchange section, it was contacted with 2N $NH_4NO_3$ solution (hot) continuously fed from spaced weir boxes, as shown diagrammatically in the drawing. The vacuum in this section was set at a low level, about 1 inch Hg. This established a pool of liquid above the belt for a length of about 5 feet. The pool was about ½ inch deep at its deepest point. A liquid level sensor device was used to control the vacuum level in this zone. As the cake passed beyond the pool, sufficient liquid was drained into the receiver associated with the vacuum box division in this section to dry superficially the cake before it passed under the dam between the ion-exchange and washing sections.

With the vacuum on the receiver for the wash liquid set at a high level of about 20 inches Hg, the cake traveling into the washing zone was rapidly contacted with wash water continuously fed through a weir box adjacent the dam wall between the ion-exchange and washing sections. Water was drained rapidly through the cake into the receiver for this section and the cake was discharged by gravity from the end of the filter belt onto a conveyor for subsequent drying. This cake was considerably drier than the cakes formed as feed for the ion-exchanging and washing sections. On the return trip, the filter cloth was washed on both sides with water.

Our invention has been described with especial reference to its utility in processing microspheres of zeolitic catalyst by steps including ion-exchange. The invention has other applications. Generally, it is best adapted to processing solids which filter rapidly under high vacuum and which filter slowly or not at all under atmospheric pressure, whereby controlled percolation can be effected by practice of our invention. Thus, the invention is of especial utility in processing finely divided noncolloidal solids, e.g., solids composed of particles predominantly in the 10 to 200 micron particle size range. These solids may be natural or synthetic and embrace, for example, minerals which undergo leaching or other rate-limited chemical reaction as well as resin particles which undergo anionic or cationic exchange. Granular solids generally tend to filter rapidly, even under atmospheric pressure and thereby the desired percolation zone would not be achieved when handling such material.

The filter unit may be varied from the three section unit illustrated. For example, the unit could be modified to include five sections. However, in operating the unit thus modified, it would be necessary to increase correspondingly the number of divisions in the vacuum box and the number of receivers. In operating the unit it would be necessary to control the vacuum depth in the receivers to assure the discharge of a carefully superficially dried cake from one section into any subsequent section in which liquid-solid contact takes place.

The dams may be omitted in operations in which overflooding from one section to another would not be encountered. Thus, the sections on the belt are established by control of vacuum depth and do not rely on the presence of dam or other retaining walls to isolate individual processing functions.

We claim:

1. A continuous method for subjecting a mass of finely divided solid particles serially to a liquid-solid mass transfer unit operation and to another liquid-solid operation carried out at a higher rate than the mass transfer operation which comprises feeding a liquid slurry of the finely divided particles to a moving continuous horizontal vacuum belt filter provided with a divided vacuum box wherein each division is associated with a separate liquid receiver and vacuum pressure controls, applying sufficient vacuum to the slurry after it is charged to the belt to produce a smooth superficially dried cake containing liquid in voids between the particles, as the cake continues to travel across said vacuum box contacting it with a solution capable of undergoing a mass transfer reaction with the particles while applying vacuum controlled at a level that will maintain a quiescent pool of liquid above the cake over a substantial length of the travle of the cake on the belt, draining sufficient liquid from the cake to form a cake having a smooth crack-free surface and containing liquid in voids between particles in the cake, adding another liquid to the cake while applying sufficient vacuum thereto to drain rapidly liquid through the cake and discharging the cake from the belt.

2. The method of claim 1 characterized by the fact that the finely divided particles form a cake which filters rapidly under vacuum of about 20 inches Hg and at an appreciably lower rate under atmospheric pressure.

3. A method for carrying out a multiplicity of liquid-solid processing steps on a single vacuum belt filter which comprises the steps of slurrying a mass of finely divided solid particles to be processed in a first liquid, feeding the slurry to the feed end of a continuously traveling horizontal vacuum belt filter, adjusting the vacuum under the feed end of the filter to a value sufficient to drain liquid from the finely divided solid particles and form a cake having a smooth, substantially dry surface but carefully limited to minimize removal of water from voids between particles and thereby introduce air into the cake, continuously adding a second liquid containing material capable of undergoing a mass transfer reaction with the finely divided particles of solid onto the surface of the resulting superficially dried cake from at least one location above the belt, and adjusting the vacuum under the section of the belt in which the second liquid is added to a level controlled to maintain a quiescent pool of liquid over the cake over a substantial length of the belt and sufficient to cause the pool to percolate through the cake as it moves on the belt, the vacuum applied to the cake after it passes under the pool being sufficient to drain sufficient liquid from the cake to provide a smooth, substantially dry surface but insufficient to remove substantial liquid from the body of the cake, whereby liquid is present in voids between particles in the cake, continuously adding a third liquid to the resulting superficially dried cake from at least one location above the cake while applying sufficient vacuum to the cake to cause rapid drainage of the liquid through the cake, and discharging the cake from the moving filter belt.

4. A continuous method for ion-exchanging fluidizable zeolitic particles which comprises slurrying said zeolitic particles with a first liquid, continuously feeding the slurry at a substantially constant rate onto the feed end of a continuous horizontal belt vacuum filter, continuously moving the belt containing the slurry serially through a cake-forming section, at least one ion-exchange section and a washing section, while vacuum is applied to separate liquid receivers under the belt, and discharging the washed cake from the belt, the method being characterized by the fact that cake leaving the cake-forming section has a substantially crack-free dry surface but contains liquid in the voids between the fluidizable zeolitic particles in the cake, the cake in the ion-exchange treatment undergoes contact with ion-exchange liquid in the ion-exchange section under percolation conditions and leaves the ion-exchange section in the form of a cake having a smooth, substantially crack-free dry surface and containing liquid in the voids between the fluid zeolite particles, and the ion-exchanged cake is washed rapidly under vacuum.

5. The method of claim 4 wherein the vacuum applied to the cake in the washing section is appreciably greater than the vacuum applied in the cake-forming section and that vacuum in the ion-exchange section is appreciably less than the vacuum in the other sections.

6. The method of claim 5 wherein the length of the ion-exchange section is appreciably greater than the length of both the cake-forming section and the washing section.

7. The method of claim 4 wherein the original zeolitic particles comprise a crystalline sodium aluminosilicate of the molecular sieve type and the sodium ions are exchanged with nonalkali metal ions.

8. The method of claim 4 wherein the liquid added in the ion-exchange section is an ammonium salt solution and the liquid used to slurry the zeolitic particles comprises spent ion-exchange solution.

9. The method of claim 4 wherein the zeolitic particles that are slurried are catalyst precursor particles in the form of microspheres comprising synthetic crystalline faujasite in sodium-exchange form and a silica-alumina residue of calcined kaolin clay, said microspheres having been produced by reacting microspheres consisting essentially of calcined kaolin clay in a sodium hydroxide solution until synthetic sodium faujasite crystallizes in the microspheres and a sodium silicate mother liquor is produced, and draining mother liquor from the resulting crystallized microspheres.

10. The method of claim 9 wherein the liquid added in the ion-exchange section comprises an ammonium salt solution and the liquid used to slurry the catalyst precursor particles comprises spent ion-exchange solution.

* * * * *